(No Model.) 7 Sheets—Sheet 1.
W. H. COOLEY.
MAGNETO ELECTRIC MACHINE.

No. 416,443. Patented Dec. 3, 1889.

(No Model.) 7 Sheets—Sheet 4.

W. H. COOLEY.
MAGNETO ELECTRIC MACHINE.

No. 416,443. Patented Dec. 3, 1889.

Witnesses:
John H Kingsbury
Morton Minot

Inventor:
Wm. H. Cooley.
By Dodge & Son
attys (No Model.) 7 Sheets—Sheet 5.
W. H. COOLEY.
MAGNETO ELECTRIC MACHINE.

No. 416,443. Patented Dec. 3, 1889.

(No Model.) 7 Sheets—Sheet 6.

W. H. COOLEY.
MAGNETO ELECTRIC MACHINE.

No. 416,443. Patented Dec. 3, 1889.

(No Model.) 7 Sheets—Sheet 7.

W. H. COOLEY.
MAGNETO ELECTRIC MACHINE.

No. 416,443. Patented Dec. 3, 1889.

Witnesses:

Inventor:
W. H. Cooley.

UNITED STATES PATENT OFFICE.

WILLIAM H. COOLEY, OF BROCKPORT, ASSIGNOR OF FIFTY-ONE ONE-HUNDREDTHS TO J. P. DUDLEY, JEWETT M. RICHMOND, AND WM. H. H. NEWMAN, ALL OF BUFFALO, NEW YORK.

MAGNETO-ELECTRIC MACHINE.

SPECIFICATION forming part of Letters Patent No. 416,443, dated December 3, 1889.

Application filed March 5, 1881. Serial No. 27,491. (No model.)

*To all whom it may concern:*

Be it known that I, WILLIAM HENRY COOLEY, of Brockport, in the county of Monroe and State of New York, have invented certain Improvements in Magneto-Electric Machines, of which the following is a specification.

The object of this invention is to increase the electro-motive force of the current generated by such machines for a given expenditure of power. I attain this object by means of devices and combinations thereof illustrated in the accompanying drawings. I employ two revolving cylindrical armatures, each traversed by the same wire or system of wires.

Figure 1:
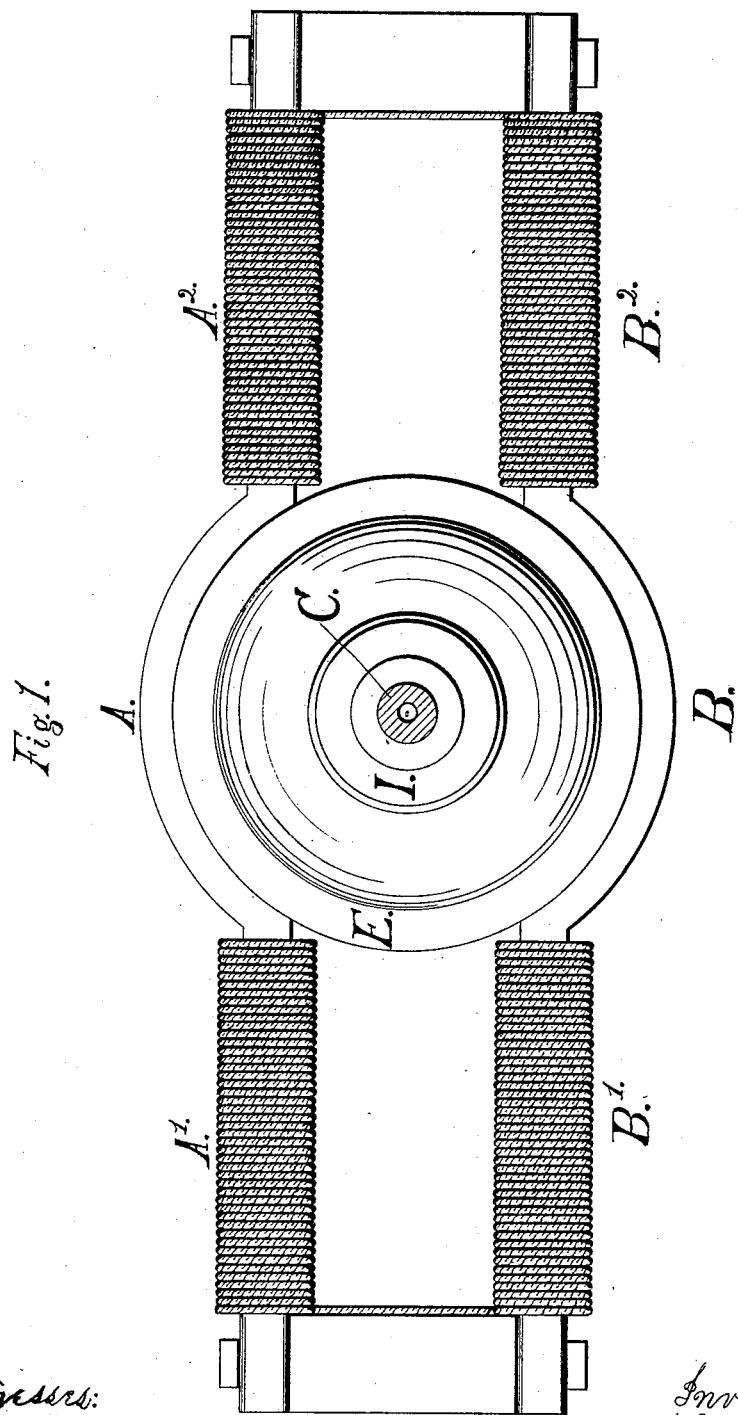
Figure 2:
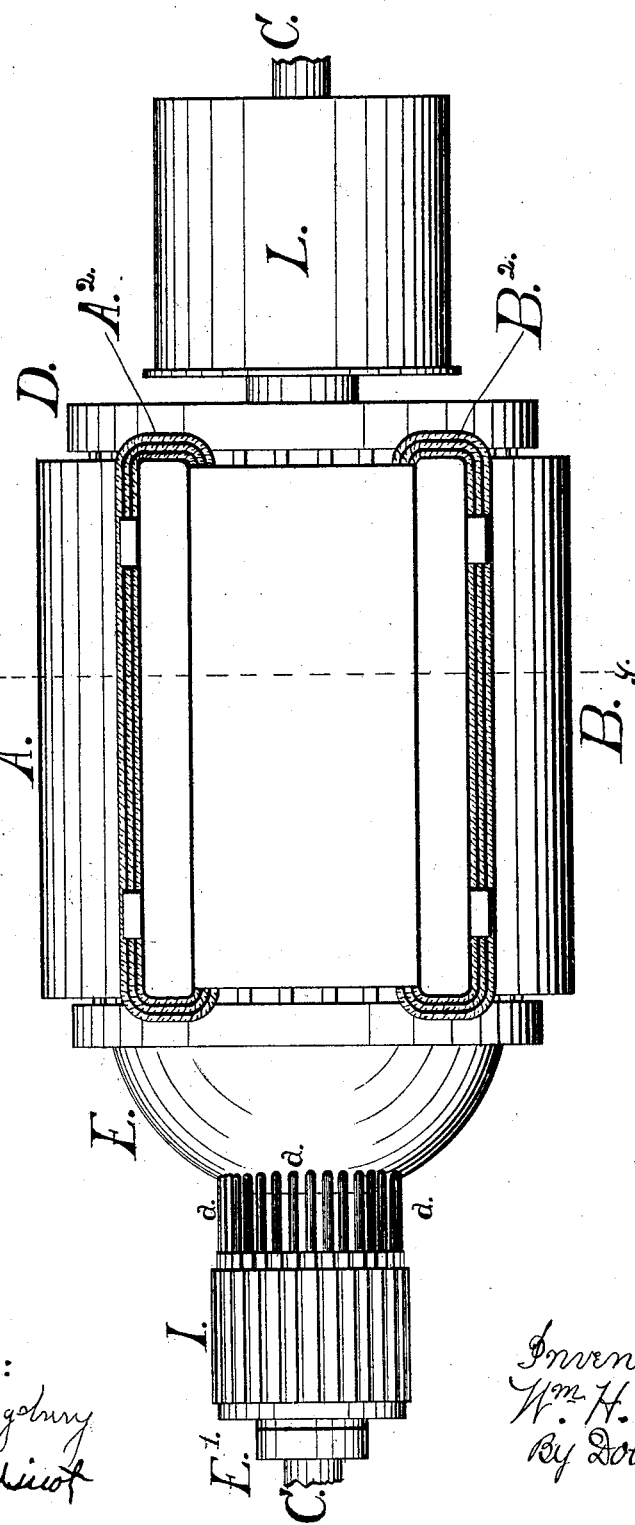
Figure 3:
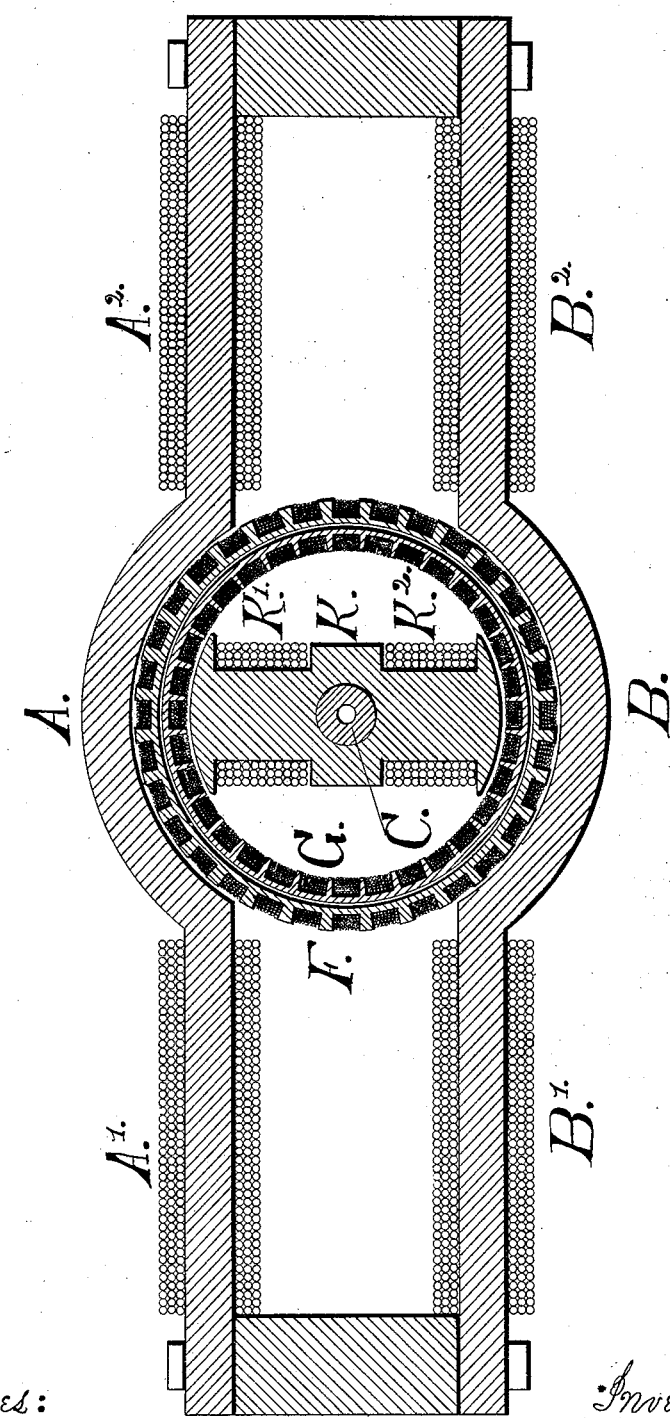
Figure 4:
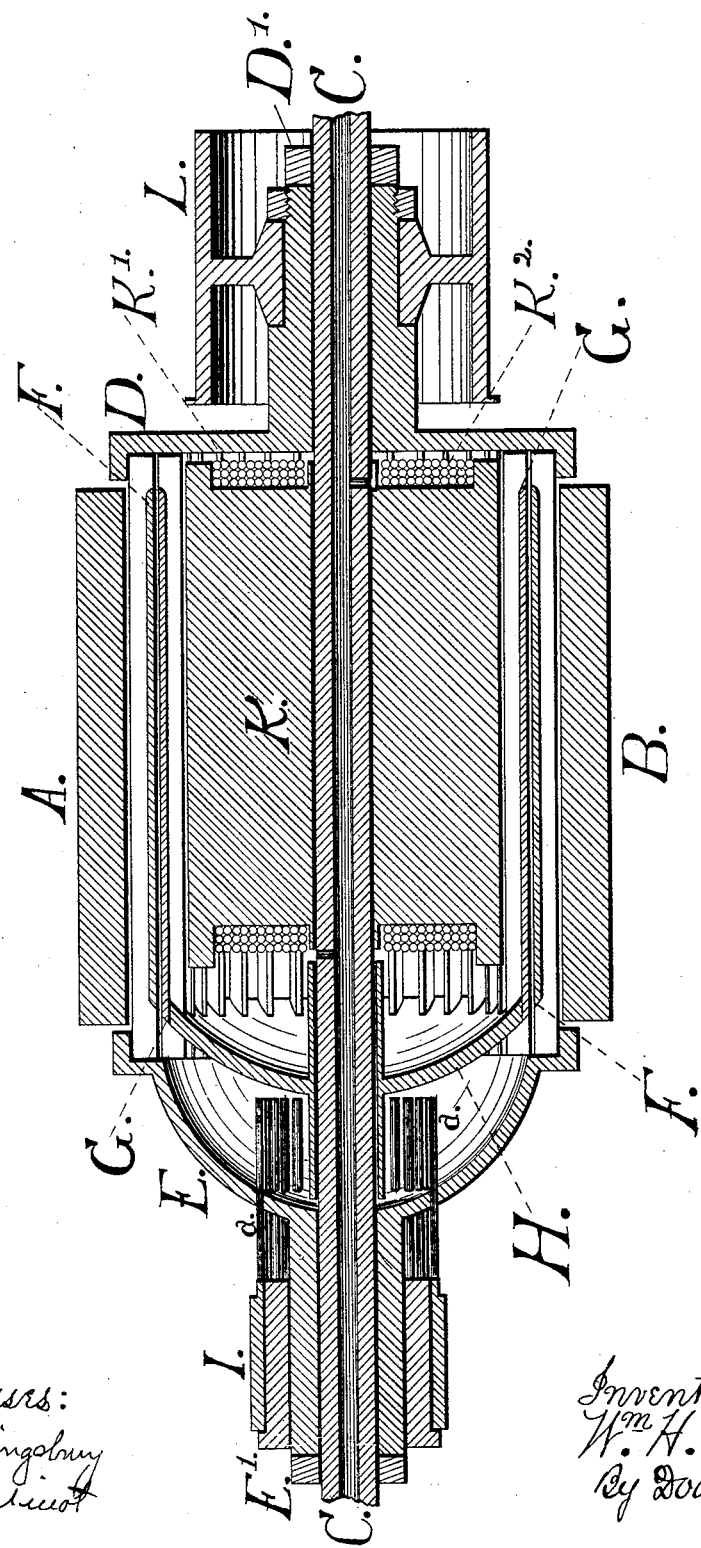
Figure 5:
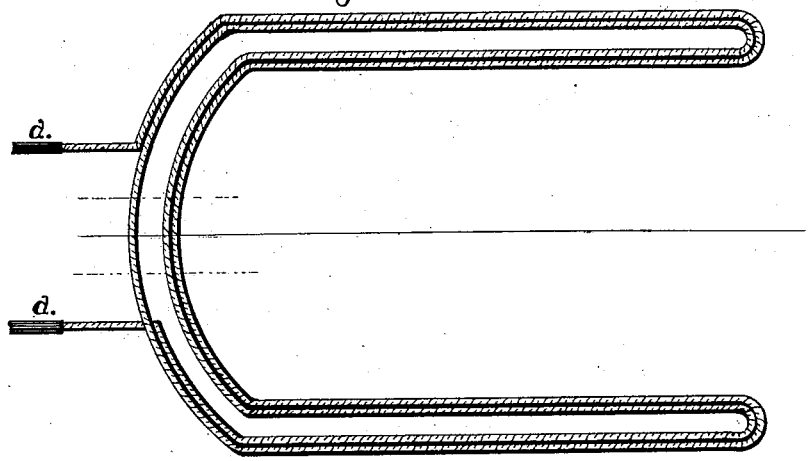
Figure 6:
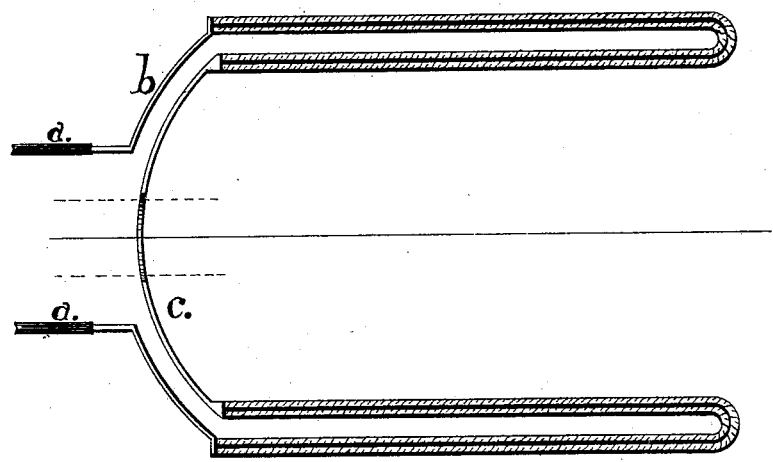
Figure 7:
Figure 8:
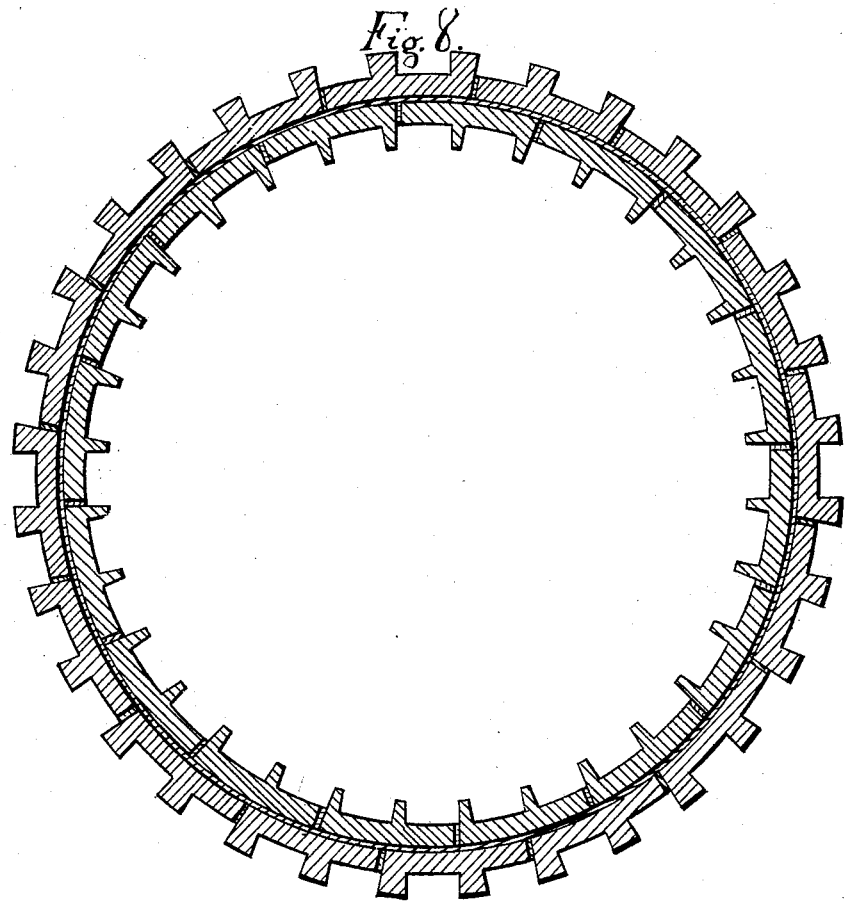
Figure 9:
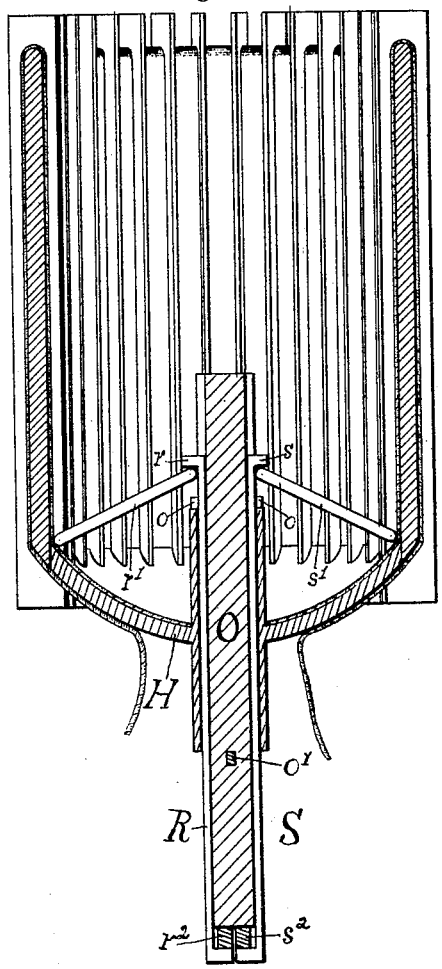

In the accompanying drawings such portions only of a dynamo-electric machine are represented as are necessary to fully illustrate this invention. The drawings are as follows: Figure 1 is a side view of the machine. Fig. 2 is an end view. Fig. 3 represents a vertical longitudinal section of the machine, along the line $x\,y$ of Fig. 2. Fig. 4 represents a vertical transverse section of the machine taken along the line of the center of the shaft, with the insulated wire all removed from the armature, so as to show more clearly the construction thereof. Figs. 5, 6, and 7 each illustrate a separate system of winding the cylindrical armatures, each figure showing the form assumed or taken by two convolutions or layers of the insulated wire when wound upon the armature, the wire in each figure being represented as greatly increased in diameter. Fig. 8 represents in vertical transverse section a series of armature-sections made of such form and so placed as to produce a discontinuous hollow cylinder formed from two discontinuous concentric cylinders, the joints of one cylinder falling between those of the other, and with each armature or section separated from those adjacent thereto by a thin layer or strip of a diamagnetic non-conductor of electricity. Fig. 9 shows my armature in vertical longitudinal section and illustrates the means for and method of winding the same according to one of my systems, as will be explained.

In my machine I employ field-magnets, the cores of which A and B are of the usual form in machines having a cylindrical armature. Upon these cores are wound the coils of insulated wire $A'$, $A^2$, $B'$, and $B^2$ in such a manner and so connected in an electric circuit that the curved polar extensions of the cores A and B assume each a polarity opposite in kind to that of the other. These curved polar extensions form each a portion of a hollow cylinder whose axis is the center of the shaft C. Supported upon this shaft and free to revolve thereon is the disk D and the hemispherical head-piece E, each of brass or other diamagnetic substance. Supported and held in position by and within the flange projecting from this disk D and from this hemispherical head-piece E by means of the projecting ends of the ribs formed thereon, as shown, is the outer cylindrical armature-section F. Within this outer cylindrical armature F, which is left smooth upon the inside, there is an inner cylindrical armature G, left smooth upon the outside, but with the ribs formed upon the inside thereof, these ribs projecting equally with those on the outer cylinder. These two cylinders are separated and insulated from each other by some diamagnetic non-conductor of electricity—such as wood, paper, vulcanite, or other equivalent substance—so as to avoid the effects of secondary induction, by which substance they are held rigidly and concentrically together. They are so positioned each to the other as regards the ribs formed thereon, and the ribs themselves on each cylinder are of such a shape and number, that there are equal spaces left opposite each other on the outside and inside, respectively, for insulated wire, as shown.

Located at one end of and rigidly connected to the inner cylinder is the concave internal head-piece H. This head-piece H has projecting from its center in either direction a hub encircling the shaft C, on which it may or may not bear. This hub serves to protect the wires with which the cylinders are wound from bearing against the shaft C. The manner in which these cylinders are wound is illustrated in Figs. 5, 6, and 7, each showing a different system for winding, explained more fully as follows:

The dotted lines in each figure indicate the extreme upper and lower edges of the hub on the concave head-piece H, and the continuous straight line in each figure indicates the center of the shaft. As shown in Fig. 5, the terminals of the wire forming each strand are soldered to the metallic rods $a$, leading to the metallic strips upon the opposite sides of the commutator I. The wire, passing from one of these rods $a$ parallel with the shaft until it meets either the head-piece H or other wires previously wound thereon, passes down along such head-piece or wires wound thereon and between the projections of the ribs formed on the cylinders, then longitudinally along the lower side of the outer cylinder and between the ribs formed thereon, thence up, around, and across the lower edges of the farther end of the two cylinders and between the projections of the ribs formed thereon, then back longitudinally along the inner surface of and between the ribs formed on the inner cylinder until it meets the inner face of this head-piece H or other wires previously wound thereon, passing thence upward as close to the inner face of this head-piece as possible. Being deflected around upon one side of the hub thereon, it continues along upon or near the inner face of this head-piece until it meets the inner surface of the inner cylinder in the opening or space formed between the ribs thereon diametrically opposite the opening for wire upon the other inner surface of this cylinder in which this wire was last wound. The wire continues thence longitudinally along the inner face of this inner cylinder between the ribs projecting therefrom, and then passes across the upper edges of the cylinders between the projecting ends of these same ribs. It is then continued back longitudinally upon the outer surface of the outer cylinder, thence across the outer surface of the head-piece H, passing around upon one side of the hub formed thereon, thence around and through this same route again, and so on until the space left for wire between the ribs upon diametrically-opposite sides of the cylinders has been filled, when the wire terminates, as shown, and is soldered to another metallic rod $a$, leading to a commutator-plate diametrically opposite to the one from which the other terminal of this same strand started. Then another pair of opposite sections or spaces upon the cylinders is wound, and so on until these sections, of which there is an even number, have all been filled. These rods $a$ are covered with some insulating material and pass through openings made therefor in the hemispherical head-piece E. They project inwardly therethrough and toward the inner head-piece H, more or less according as the armature is wound, in the manner already described, and illustrated in Fig. 5, or in the manner illustrated in Fig. 6, which is as follows: These rods $a$ are shown in Fig. 4 as passing through the head-piece E to a proper distance for winding according to this system, in which a number of insulated wires are grouped together to form a strand of such a size and shape that it shall completely fill the space left therefor between the projecting ribs upon the cylindrical armature. This strand of wire is bent in the form of a U laid flatwise, with the distance between the prongs such that they shall just span and inclose the space occupied by one side of the two cylindrical armatures, as shown. These prongs are of such a length that those upon the outer surface of the outer cylinder after being trimmed off square and true shall each bear against a metallic connecting-plate $b$ of low resistance, one end of which makes connection, as shown, with one of the rods $a$, while the other end, as shown, terminates in an enlarged projection, against which, as already described, one end of each of these U-shaped strands of wire bears and to which it is firmly soldered.

Between the other and inner ends of any two opposite strands of wire, after the same have been trimmed off square and true and of the proper length, the metallic plates $c$ make connection, as shown. These plates have at each end an enlarged projection similar to those upon the outer ends of plates $b$, against which the inner terminals of two opposite strands bear and to which they are soldered. Of these plates $c$ there will of course be one-half as many in number as there are spaces left between the ribs upon the cylinders for wire, while of the plates $b$ there will be as many as there are spaces left for wire on either cylinder. These plates $b$ and $c$, together with the U-shaped strands to which they are connected, are so arranged in reference to the commutator-strips, as shown, that the current excited in each of these strands is connected with that excited in an opposite one in a manner for tension, and the combined effect or resultant current is taken off at the metallic strips upon diametrically-opposite sides of the commutator. These strips $c$ are bent edgewise around the hub of the head-piece H, and are insulated from each other, and are superimposed upon each other as the winding progresses.

In Fig. 7 is shown a somewhat modified arrangement of this last-described system of winding, in which the same metallic plates $b$ are used and for the same purpose and in the same manner; but in place of the metallic plates $c$, as shown in Fig. 6, there are used metallic plates $c'$, connecting in the manner already described, with the inner terminal of each U-shaped strand, as shown, and making a metallic connection, by means of rods $a'$, with the strips of a secondary commutator, on which the strip forming the inner terminal for any one U-shaped strand is adjacent or similarly situated to that forming the terminal for the outer prong of such strand and located on the primary or first commutator, wherefore any two adjacent metallic strips, one being located in each commutator, form the terminals for the current generated in that one of the U-shaped strands to which they are connected.

In the system of winding as shown in Fig. 5 and already described, after the winding of the first complete strand each succeeding strand crosses each of the others, already wound, upon each face of the head-piece H, which serves the purpose of keeping these wires in position. This head-piece H, which may be of any substance, preferably magnetic, is concaved on the inside of the cylinder, as shown, so that the wires projecting from or built out upon the inner face thereof shall not interfere with or take up the space within the inner cylinder, which is left free, so far as possible, for the location therein, as shown, of an interior field-magnet K, upon which are wound, as shown, the coils of insulated wire K' and $K^2$, the terminals for these coils passing through the lateral openings shown in shaft C and into the hole bored longitudinally through the center thereof, thence outward through the hole in this hollow shaft. These coils are so wound, connected together, and placed in an electric circuit, together with the coils of the external field-magnets, that either pole of this external field-magnet is of the same kind or name as the polar extension of the external field-magnet adjacent thereto.

To allow ample room for and to cover up and protect the wire projecting from the outer side of the head-piece H, the head-piece E is made hemispherical in form and hollowed out hemispherically upon the inside, as shown. The outer and inner cylindrical armatures, when wound in any of the methods already described, or any combination of such methods, are secured to the disk D at one end by means of screws or pins (not shown) passing through the flange formed on the disk and into the projecting ends of the ribs formed on the cylinders. In the same manner these cylinders are secured at the other end to the hemispherical head-piece E. From the center of this disk D there is projecting outwardly to a considerable distance a hub, upon which is secured, as shown, by means of a nut, the driving-pulley L. Projecting outwardly from the hemispherical head E, also, to a considerable distance is another hub, upon which is located the commutator I. The hub of disk D and also that of head E are each bored out accurately to fit the stationary shaft C, upon which they revolve. They are adjusted in any desired position, and prevented from sliding endwise thereon by means of the collars D' and E', adjustable upon and secured to the shaft each by means of a set-screw. (Not shown.)

When desired, an inner cylinder only may be used and wound upon the inside. Such cylinder then may have a head-piece at each end similar to the one H to wind against, the wires in this case taking the form usually assumed in machines having cylindrical armatures, but being wound, instead of upon the outside of a cylinder, longitudinally upon the inside of a hollow cylinder. In this case either external or internal only or both external and internal field-of-force magnets may be employed, or there may be used the outer cylinder only, wound in the usual method, and with a stationary magnet supported within such revolving cylindrical armature and with or without poles of field-of-force magnets exposed externally thereto. Again, these two cylindrical armatures may be magnetically combined or united, so as either to form or be made in one and the same armature, and may be wound in exactly the same methods as already described; or a series of armatures formed, arranged, and separated as shown in Fig. 8, and supported and revolved as in the manner before described, may be wound with insulated wire either externally or internally, or both externally and internally, in either continuous or separate adjacent coils, or in conjoined opposite coils, or in continuous opposite coils, and exposed either externally or internally, or both, to magnetic poles, and the current generated thereby taken from a commutator by springs in the usual manner.

Referring to Fig. 9, which shows the method of winding opposite armature-sections in one continuous coil, it will be readily seen that the armature is wound externally like all others of its class, but that in winding it internally it is necessary to secure the wire in the angle at the junction of the armature-core with the internal head-piece H. This I accomplish in the manner and by the means described, as follows: First, for winding, it is preferable that the armature-core be rigidly secured in a vertical position, and then through the hub of head-piece H is inserted the shaft O (shown in section) by passing it down through such hub from the upper side. A collar o on shaft O prevents it from passing clear through this hub on head-piece H, and by means of this collar o and a key or wedge o' coming just under the lower end of this hub on head-piece H, this shaft O is clamped in any desired position of angular or rotary adjustment to accommodate the winding of the different sections of the armature. Shaft O is grooved on opposite sides to receive the slide-bars R and S, (shown full,) which work therein, and are kept in place by the hub on head-piece H, and have thereon, respectively, at their upper ends the projections r and s, by means of which, when the slide-bar R and S, respectively, are drawn downward, the bars r' and s' are caused to press downward and outward at their lower ends in opposite sections on the armature and at the junction of the head-piece H with the armature-core. These slide-bars R and S, respectively, are firmly drawn down and held by means of the wedges $r^2$ and $s^2$, thus securely holding, in the angle between the head-piece H and the armature-core, each convolution of wire already wound while the next is being wound externally; but the bars $r'$ and $s'$ are removed, each one at a time, during the winding of each convolution on the inside of the armature, and then each one is replaced and clamped down as soon as the wire has been placed in the angle in position to be clamped thereby, and so on until one complete layer has been wound. Then that layer is firmly cemented together and to the armature-core and head-piece H by rubber cement, melted shellac, or any other suitable cement, and then the next layer is proceeded with in the same way, and so on until one completed coil has been wound, and then shaft O is released and adjusted and clamped for the next coil, and that is wound in the same manner, and then the next, and so on until the armature has been fully wound, each separate layer of each coil being carefully cemented, as stated.

The operation of this machine is substantially as follows: Where both cylinders are employed and wound in any of the methods already described, it will be seen that upon the revolution of the armatures there is exposed to the inductive effort of such armatures and to that of the field-of-force magnets exciting the same a double length of wire, whereby for a given diameter and length of cylinder twice as much wire is placed in a position favorable to induction for the same amount of dead resistance in traversing the diameter of such cylinders as in the case of machines having single cylindrical armatures wound only exteriorly. This feature, together with the location within such cylinders of an interior field-of-force magnet, constitutes the essential difference between this machine and machines in general having cylindrical armatures wound only exteriorly, which this machine resembles as to other points in operation. This operation is substantially the same in effect when both cylinders are combined to form one and the same armature. Again, when either the interior or exterior cylinder only is used the effect and operation are the same as in cylindrical machines having the armature wound exteriorly, with this exception, that the arrangement and form of the parts being different, the cylinder is exposed either upon its outer or inner surface in much closer proximity to the field-of-force magnets.

In the drawings and the above description relating thereto, the armature or armatures are represented as being exposed both exteriorly and interiorly to only two magnetic poles. The number of poles may be increased as desired. The current generated by the machine is taken off from the commutator by means of springs pressing thereon in the usual manner. The field-magnets may have their coils placed in the working-circuit of the machine, or these coils may receive only a portion of such circuit, or they may be placed in any electric circuit external to the machine.

With an armature constructed substantially as shown in Fig. 8 and already described, and wound in any of the above-described methods, the operation is substantially as already described, except that the armature, being made up of smaller sections, is capable of acquiring and losing magnetism with a greater degree of rapidity.

It will be observed that in each of the constructions shown the machine contains a hollow cylindrical armature, the main difference between the different forms shown consisting in the fact that the armature is composed in one instance of a greater number of sections than in another.

Having thus described my invention, what I claim is—

1. In a magneto-electric machine, the armature composed of two concentric hollow cylinders of magnetic substance, having longitudinal ribs formed thereon, substantially as shown, said cylinders being separated from each other by a diamagnetic non-conducting substance wound with insulated wire and supported from a central axis, substantially as shown and described.

2. In a magneto-electric machine, an armature composed of two concentric hollow cylinders separated by a diamagnetic non-conducting substance, means, substantially such as shown, for revolving said armature, and magnetic poles exposed both externally and internally with reference to the armature, substantially as described and shown.

3. In a magneto-electric machine, a hollow cylindrical armature formed with longitudinal internal ribs, insulated wire wound within the armature, means, substantially such as described, for revolving the armature, and magnetic poles exposed to said armature both inside and outside thereof.

4. In a magneto-electric machine, a hollow cylindrical armature consisting of two concentric cylinders composed of separate sections, the joints of one cylinder arranged between those of the other cylinder, the sections being separated from each other by diamagnetic non-conducting material.

5. In a magneto-electric machine, a magnetically-discontinuous hollow cylindrical armature, in combination with insulated wire wound thereon, substantially as described and shown.

6. In a magneto-electric machine, a hollow cylindrical armature consisting of sections separated by diamagnetic non-conducting material, in combination with insulated wire wound thereon both externally and internally and magnetic poles exposed to said armature both externally and internally.

7. In a magneto-electric machine, an electro-magnet located within and inclosed by a hollow cylindrical magnetically-discontinuous armature wound with insulated wire, in combination with means, substantially as shown, for revolving said armature.

8. A hollow cylindrical armature, insulated wire arranged on the exterior and interior surfaces of such armature in lines parallel with the axis thereof, and with the inoperative or dead connecting portions of such insulated wire located at one end of such armature.

9. A hollow cylindrical armature, insulated wire arranged on the exterior and interior surfaces of such armature in lines parallel with the axis thereof, and with the inoperative or dead connecting portions of such insulated wire located at one end of such armature, and means for supporting and revolving such armature and exposing the same externally to magneto-inductive influences.

10. A hollow cylindrical armature, insulated wire arranged on the exterior and interior surfaces of such armature in lines parallel with the axis thereof, and with the inoperative or dead connecting portions of such insulated wire located at one end of such armature, and means for supporting and revolving such armature and exposing the same internally to magneto-inductive influences.

11. A hollow cylindrical armature, insulated wire arranged on the exterior and interior surfaces of such armature in lines parallel with the axis thereof, and with the inoperative or dead connecting portions of such insulated wire located at one end of such armature, and means for supporting and revolving such armature and exposing the same both externally and internally to magneto-inductive influences.

WM. H. COOLEY.

Witnesses:
P. T. DODGE,
ROBT. L. MILLER.